United States Patent

[11] 3,608,787

| [72] | Inventor | Xavier Roger Grataloup<br>Montereau, France |
|---|---|---|
| [21] | Appl. No. | 833,305 |
| [22] | Filed | June 16, 1969 |
| [45] | Patented | Sept. 28, 1971 |
| [73] | Assignees | Societe Anonyme: Nodet-Gougis<br>Montereau, ;<br>Paul Lamazou<br>Astis par Auriac (Basses Pyrenees); Jean Lamazou, Eurds (Basses Pyrenees), Morlass, France, part interest to each |
| [32] | Priority | July 24, 1968 |
| [33] | | France |
| [31] | | Pv 160 452 |

[54] DEVICE FOR ELIMINATING DOUBLE SEEDS IN DISTRIBUTORS FOR SOWING MACHINES
5 Claims, 5 Drawing Figs.

[52] U.S. Cl. ................................................ 222/342
[51] Int. Cl. ................................................ G01f 11/06
[50] Field of Search ..................................... 222/342

[56] References Cited
UNITED STATES PATENTS

| 1,746,590 | 2/1930 | Hagle, Jr. ..................... | 222/342 X |
| 2,546,300 | 3/1951 | Fritts ............................ | 222/342 X |
| 3,010,615 | 11/1961 | Smith et al. ................... | 222/342 X |
| 3,031,109 | 4/1962 | Krag ............................ | 222/342 X |

*Primary Examiner*—Lloyd L. King
*Attorney*—Melville, Strasser, Foster & Hoffman ABSTRACT: The present invention relates to a device for eliminating double seeds or seed clusters in distributor for sowing machines.

The object of the invention is a device constituted by a selector plate which is applied against the rotary disc provided with seed suction holes and which is cut out on one of its edges, so as to form a series of hollow and projecting points constituting a succession of fixed contact points situated tangentially in relation to the trajectory of the conglomerated packets or clusters of seeds near the suction holes, these fixed points having the effect of turning each conglomeration of seeds around and/or over said holes and, through their dissociative contact, effecting the elimination of all double seeds or additional seeds situated around each of the suction holes.

INVENTOR

XAVIER ROGER GRATALOUP

By MELVILLE, STRASSER,
  FOSTER AND HOFFMAN
                ATTORNEYS

INVENTOR
XAVIER ROGER GRATALOUP
By MELVILLE, STRASSER,
FOSTER AND HOFFMAN
ATTORNEYS

DEVICE FOR ELIMINATING DOUBLE SEEDS IN DISTRIBUTORS FOR SOWING MACHINES

The present invention relates to a device for eliminating double seeds or seed clusters in distributors for sowing machines, more particularly a distributor for sowing machines, which comprises a seed box 40 and a suction box 41 which are separated from one another by a rotating disc provided with a row of perforations of dimensions smaller than those of the seeds to be sown, and in which distributor said boxes are bounded in relation to the row of perforations in the disc in such a manner that over part of their ascending travel said perforations are simultaneously in communication with the seed box and with the suction box, then are in communication with the latter alone during the descending travel, and finally are subjected to atmospheric pressure on both faces of the rotating disc near the lowest point of its travel, thus bringing about the release of the seed in that zone through the seed discharge duct 42.

In addition, the distributor contains a double seed eliminating device constituted by a fork having two teeth which are directed towards the disc and the orientation of which is adjustable, so as to allow on each side of the row of perforations a free corridor to be formed, the width of which depends on the orientation of the fork.

The system constructed in this manner has the disadvantage of not permitting the elimination of seeds aligned in the areas not swept by the teeth of the fork.

The aim of the invention is to effect the completest possible elimination of excess seeds, including seeds aligned in the aforesaid manner.

For this purpose the invention has as object a device constituted by a selector plate which is applied against the rotary disc provided with seed suction holes and which is cut out on one of its edges, so as to form a series of hollows and projecting points constituting a succession of fixed contact points situated tangentially in relation to the trajectory of the conglomerated packets or clusters of seeds near the suction holes, these fixed points having the effect of turning each conglomeration of seeds around and/or over on said holes and, through their dissociative contact, effecting the elimination of all double seeds or additional seeds situated around each of the suction holes.

The fixed contact points may have the form of saw teeth distributed over an arc of a circle, the radius of which is substantially equal to that of the circumference on which are situated the centers of the suction holes formed in the rotary disc.

The fixed contact points may be constituted by a plurality of inclined planes which gradually partially close the suction holes and which terminate abruptly.

The fixed contact points may also be constituted by inclined planes provided with saw teeth.

The selector plate is mounted for pivoting around a fixed shaft and can be subjected to the action of an eccentric adjusting system controlled by a lever adapted to be locked on a graduated sector, in order to vary the distance between the fixed points and the axis of the trajectory in dependence on the size of the seeds.

The invention is described in greater detail below with reference to the accompanying drawings, in which.

The selector plate constructed in accordance with the invention consists essentially of a plate 1 (FIG. 1) of metal, plastics or other material containing a recess or hole 2 of oblong shape and a circular hole 3.

The bottom edge of the plate 1 is cut away so as to present a succession of hollows and angular projections, the edges of which constitute a corresponding number of fixed points of contact with the seeds to be dissociated and eliminated.

Figure 1:
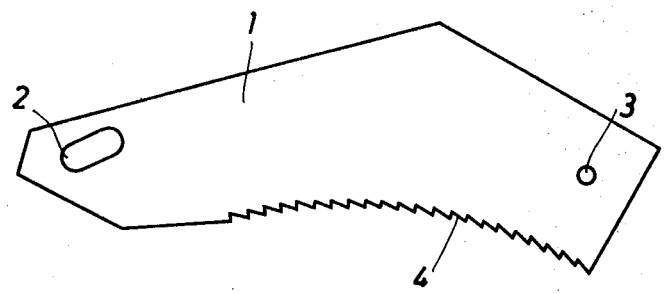
FIG. 1 illustrates a first form of construction of the selector plate.
Figure 2:
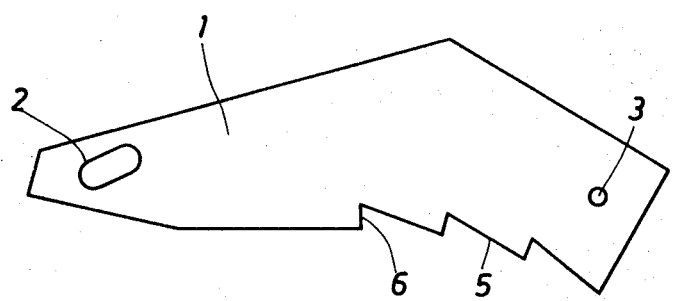
FIG. 2 illustrates another form of construction of the selector plate.

In FIG. 1, the contact hollows and projections are formed by a series of saw teeth 4, the points of which are situated on an arc of a circle the radius of which is substantially equal to that of the circumference on which are situated the centers of the suction holes provided in the rotary disc of the seed distributor. This saw tooth form is not critical. FIG. 2 illustrates an alternative construction in which the operative portion of the plate is provided with a plurality of inclined planes 5 separated by impact faces 6 directed towards a point near the center of the rotary disc of the seed distributor.

Figure 3:
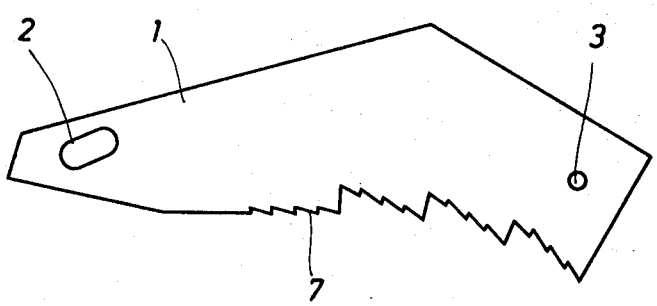
FIG. 3 illustrates a modified construction of said plate.

FIG. 3 illustrates another modified construction resulting from the combination of the first two forms of construction referred to above. In this modification, the plate 1 is provided with inclined planes 7 cut to form saw teeth.

Figure 4:
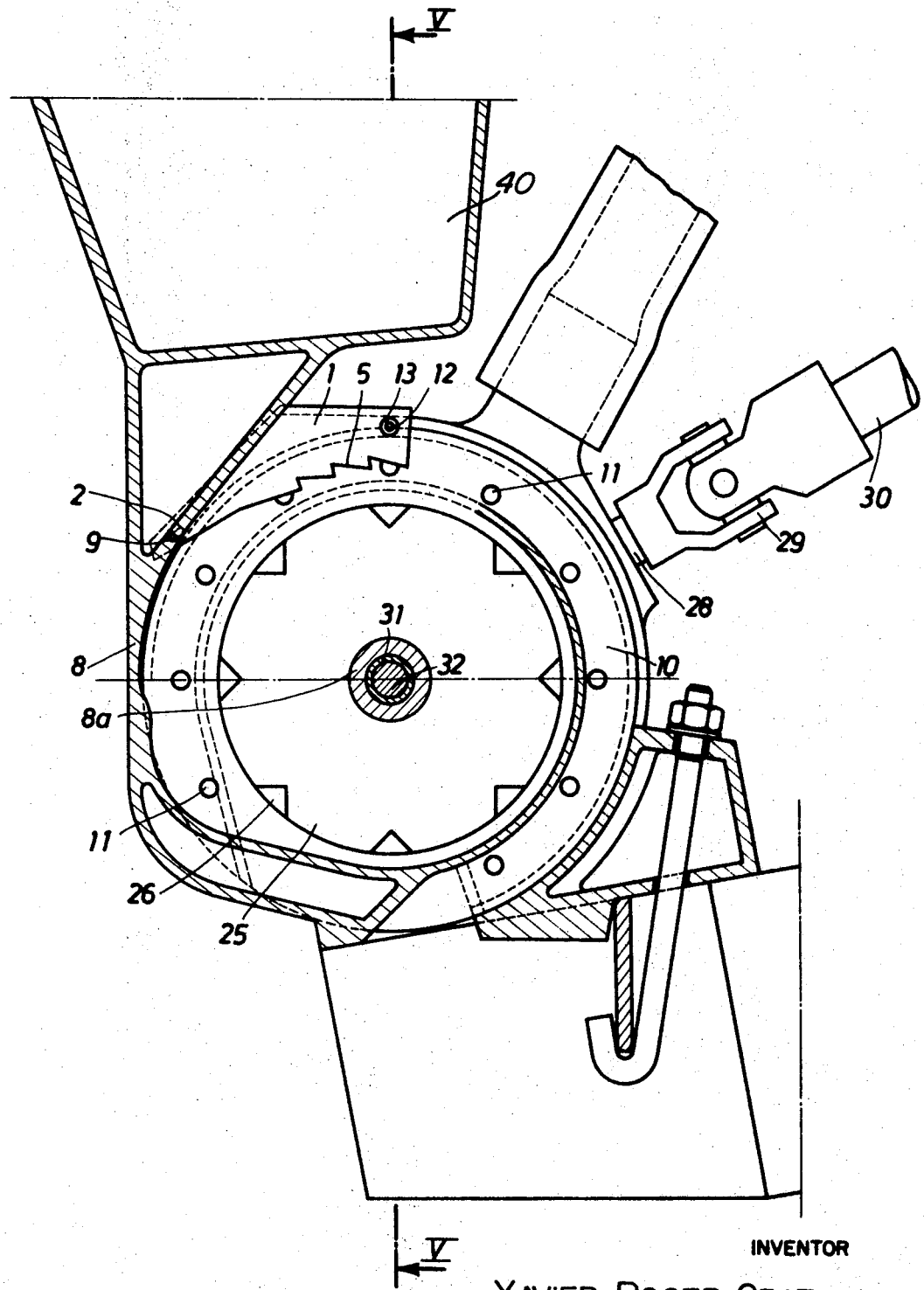
FIG. 4 illustrates the method of mounting the selector plate on the distributor device of a sowing machine, viewed in section along the line IV—IV in FIG. 5.

The plate 1 is used in the following manner:

In the body 40 (FIG. 4) of the seed box of the distributor there is fixed a pivot 9 engaging the recess or hole 2 in the selector plate 1, which is adapted to oscillate on said pivot and to be displaced slightly on it.

Figure 5:
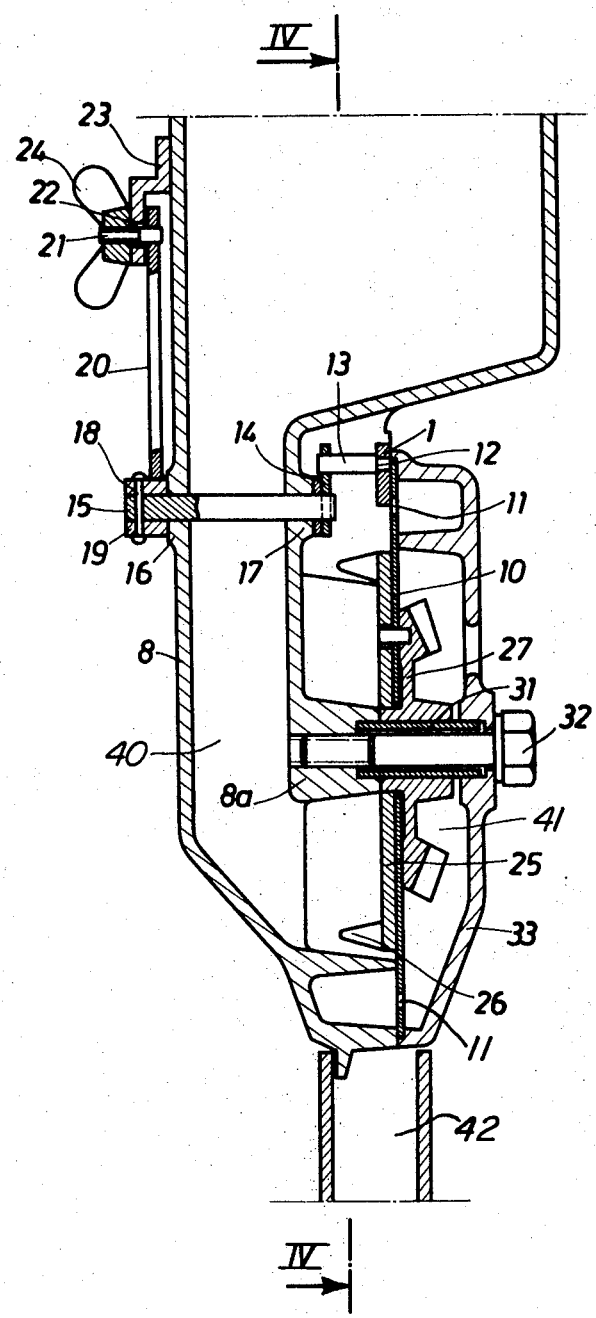
FIG. 5 is a section along the line V—V in FIG. 4.

The plate 1 (FIG. 5) thus held at its end is applied against the rotary disc 10, which is provided with suction holes 11. In the plate 1 there is fixed the end 12 of a pivot pin 13 passing through a small arm 14 keyed on a shaft 15 adapted to pivot in two bearing surfaces 16 and 17 provided in the walls of the seed box 40.

On the shaft 15 there is fixed by a pin 18 the hub 19 of a lever 20 carrying a crankpin 21 passing through a curved aperture 22 formed in a graduated sector 23 secured to the seed box.

The crankpin 21 is threaded at its end and the arm 20 can thus be locked on the sector 23 by means of a wingnut 24.

The operation of the device is very simple.

The seeds are driven rotationally in the usual manner by the agitator plate 25 (FIGS. 4 and 5) provided with blades 26 and fastened to a bevel pinion 27 and to the disc 10. Said pinion engages with another pinion (not illustrated) receiving its movement from a shaft 28 connected by a cardan joint 29 to another shaft driven in any conventional manner.

The agitator plate 25 and the pinion 27 turn on a sleeve 31 of bronze or other antifriction material held by a screw 32 between a flange 33 on the suction box and a boss 8a on the inside wall of the seed box 8.

In the course of their rotation the seeds not sucked against the holes 11 in the disc 10 tend to conglomerate around said holes in the form of a packet or cluster. But when in the course of its trajectory the packet or cluster encounters a succession of fixed contact points constituted by the edges of the inclined planes 5 of the plate 1, it is broken up by this succession of contacts applied tangentially in relation to the aforesaid circular trajectory and having the effect of turning said packet or cluster around and/or over on the hole 11 in the presence of the plate 1 and thus permitting suction and the elimination of the seeds which made up said packet or cluster at the aforesaid hole 11.

This method of elimination makes it possible to provide the succession of aforesaid fixed points on one side only of the trajectory of the seeds.

As previously stated, the separator plate 1 may be provided with various cutouts intended to constitute the fixed contact points. The embodiments illustrated in FIGS. 1 to 3 are quoted as examples without restriction, but it has been found in tests that the form illustrated in FIG. 3 was the most effective with the largest number of seeds.

The device can in fact be adapted to different seed sizes by means of the adjustment system controlled by the arm 20 (FIG. 5), which makes it possible to vary at will the distance between the fixed contact points and the axis of rotation of the plate 25, that is to say the axis of the trajectory of the seeds.

The graduation of the sector 23 permits easy adjustment of the positions of the plate 1 in relation to the size of the seeds to be sown.

Modifications as to form and details may obviously be made to the device described hereinabove simply by way of example without limitation, without thereby departing from the spirit of the invention.

What is claimed is:

1. A device for eliminating seed clusters in single-seed distributors for sowing machines including a seed box, a suction box adjacent thereto, and a rotary disc separating the suction box from the seed box and provided with a row of perforations smaller than the seeds to be sown, the said device comprising a selector plate mounted adjacent to the rotary disc and having on one of its edges a series of hollows and projections constituting a succession of fixed contact points placed tangentially in relation to the path of seed clusters held by suction on the said perforations, said fixed contact points being arranged to disintegrate the clusters by rotating them on said perforations so that only one seed is distributed.

2. A device according to claim 1, in which the fixed contact points of the selector plate are constituted by saw teeth distributed over an arc of a circle the radius of which is substantially equal to that of the circumference on which are situated the centers of the perforations formed in the rotary disc.

3. A device according to claim 1, in which the fixed contact points of the selector plate are constituted by a plurality of inclined planes set in a position to gradually partly cover the perforations as they approach the selector plate, each inclined plane terminating in a face transverse to the said path.

4. A device according to claim 1, in which the fixed contact points of the selector plate are constituted by inclined planes each provided with saw teeth.

5. A device according to claim 1, in which the selector plate is pivotally mounted and its distance from the said path is adapted to be adjusted to a value compatible with the size of the seeds to be sown by means of an eccentric adjusting system that includes a control lever movable over and adapted to be locked with respect to a graduated scale.